(12) United States Patent
Chen

(10) Patent No.: US 7,371,087 B2
(45) Date of Patent: May 13, 2008

(54) CARD CONNECTOR WITH A FRAME

(75) Inventor: Kun-Hua Chen, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/434,302

(22) Filed: May 15, 2006

(65) Prior Publication Data

US 2006/0258198 A1    Nov. 16, 2006

(30) Foreign Application Priority Data

May 16, 2005    (CN) .................. 2005 1 0040087

(51) Int. Cl.
*H01R 13/62* (2006.01)

(52) U.S. Cl. .................................... 439/159
(58) Field of Classification Search .......... 439/159, 439/151–157
See application file for complete search history.

(56) References Cited

U.S. PATENT DOCUMENTS

| | | | | |
|---|---|---|---|---|
| 5,967,813 | A * | 10/1999 | Ho et al. ............... | 439/159 |
| 5,997,324 | A * | 12/1999 | Ho et al. ............... | 439/159 |
| 6,162,075 | A * | 12/2000 | Hara et al. ............. | 439/159 |
| 6,210,187 | B1 * | 4/2001 | Tung ..................... | 439/159 |
| 6,290,136 | B1 * | 9/2001 | Koseki et al. ........ | 235/475 |
| 6,729,893 | B2 * | 5/2004 | Ezaki .................... | 439/159 |
| 6,729,894 | B2 * | 5/2004 | Ooya et al. ........... | 439/159 |
| 6,790,061 | B1 * | 9/2004 | Lai et al. ............... | 439/159 |
| 6,896,555 | B1 * | 5/2005 | Su et al. ................ | 439/630 |
| 6,976,860 | B1 * | 12/2005 | Su ......................... | 439/159 |
| 7,104,820 | B1 * | 9/2006 | Lu et al. ................ | 439/159 |
| 2007/0004257 | A1 * | 1/2007 | Hsu et al. .............. | 439/159 |

* cited by examiner

*Primary Examiner*—Truc T. Nguyen
*Assistant Examiner*—X. Chung-Trans
(74) *Attorney, Agent, or Firm*—Wei Te Chung

(57) ABSTRACT

A card connector includes an insulating housing (10), a number of contacts (20), an ejector (30) and a metal frame (40). The insulating housing (10) defines a card receiving space (13) with a card insertion/ejecting direction. The contacts (20) are retained in the insulating housing (10). The ejector (30) is assembled to the insulating housing (10), including a slider movable in the card insertion/ejecting direction and a spring with a precompression at a preliminary position. The metal frame supports the opposed ends of the ejector to hold the elasticity of the spring.

20 Claims, 5 Drawing Sheets

CARD CONNECTOR WITH A FRAME

BACKGROUND OF THE INVENTION

1. Field of the Invention

The present invention is generally related to a card connector, and especially to a card connector which is adapted for insertion/ejecting of a card.

2. Description of Related Art

Card connectors are widely used in variety electrical equipments for building electrical paths between the electrical equipments and electrical cards. A card connector usually has an ejector for ejecting the electrical card received therein, furthermore, to make sure the spring member of the ejector has enough elasticity to eject the electrical card, the spring member is given a precompression at an preliminary position, so the insulating housing which generally supports the spring get a force by the spring in the preliminary position. During a process of soldering the terminals of the card connector to a print circuit board, the insulating housing has to be set in a furnace to be heated, and then the part of the insulating housing forced by the spring will be destroyed.

U.S. Pat. No. 6,875,033 discloses a commonly card connector adapted for receiving an electrical card. The card connector defines a card receiving space and comprises an insulating housing, a plurality of contacts received in the insulating housing, an eject mechanism and a metal shell covering the insulating housing. The eject mechanism is disposed in the insulating housing, and comprises a slider formed with a heart-shape groove and movable along an insertion/ejecting direction, a guiding pin and a spring. The spring has two ends respectively abutting against the slider and a sidewall of the metal shell at a primary position, and an end of the slider away from the spring is against the insulating housing. So the metal shell and the insulating housing hold the elasticity of the spring at the primary position, together, but the insulating housing still need to hold a part elasticity, and the problem does not be solved completely.

Hence, an improved card connector is highly desired to overcome the aforementioned disadvantages of the prior art.

SUMMARY OF THE INVENTION

Accordingly, an object of the present invention is to provide a card connector, which supports the resilient member of the ejector by a metal frame.

To achieve the above object, a card connector is adapted for receiving a card and comprises an insulating housing defining a card receiving space with a card insertion/ejecting direction, a plurality of contacts retained in the insulating housing, an ejector received in the insulating housing and a metal frame. The ejector has a slider movable along the card insertion/ejecting direction, an ejector member and a resilient member disposed in an end of the slider. The metal frame holds the ejector at a preliminary position, with two opposed ends respectively abutting against the slider and the resilient member at an original position.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
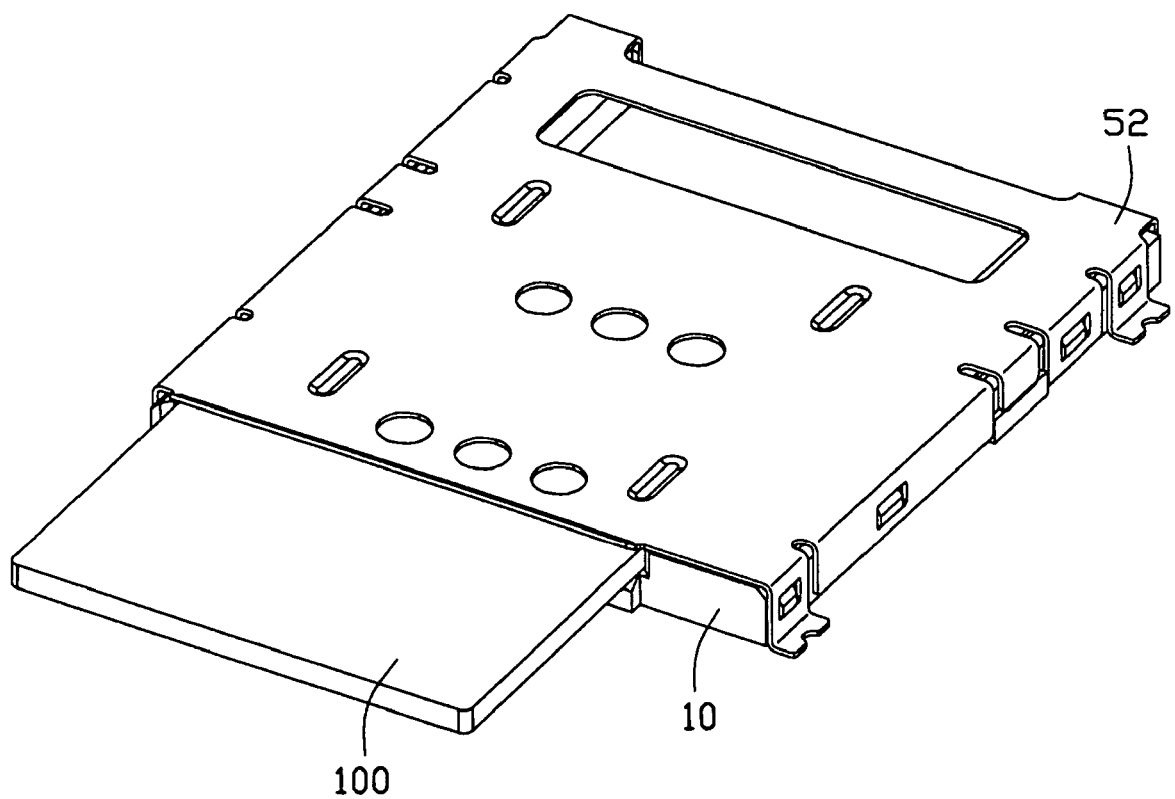
FIG. 1 is an assembled, perspective view of a card connector in accordance with the present invention with a card therein.
Figure 2:
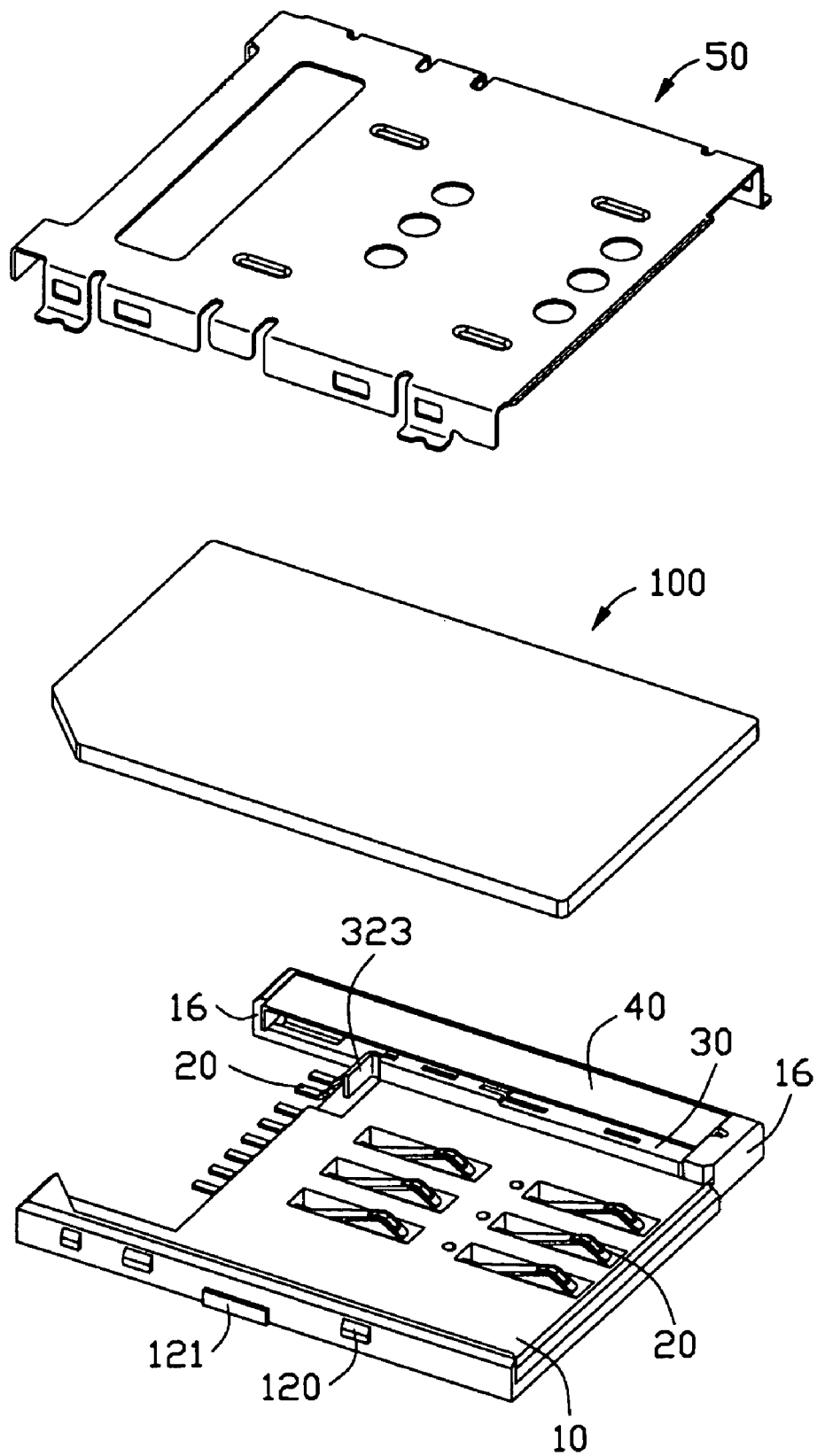
FIG. 2 is a partially exploded, perspective view of the card connector in accordance with the present invention.

Referring to FIGS. 1-2, the card connector in accordance with the present invention is adapted for receiving a card 100, such as a SIM card. The card connector comprises an insulating housing 10, a plurality of contacts 20 received in the insulating housing 10, an ejector 30, a metal frame 40 and a shell 50 for covering the insulating housing 10.

Figure 3:
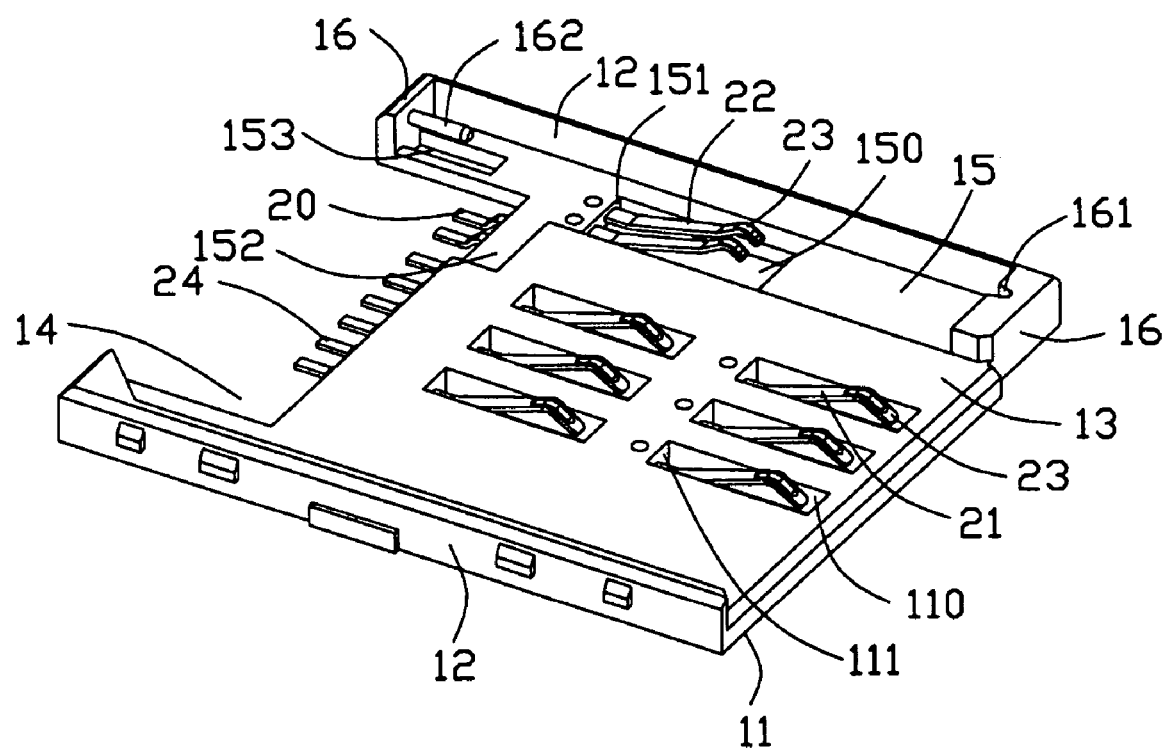
FIG. 3 is an perspective view of the insulating housing of the card connector in FIG. 1 with a plurality of contacts retained therein.

Referring to FIG. 3, the insulating housing 10 is approximately a rectangle configuration. The insulating housing 10 comprises a bottom wall 11 and a pair of opposite right and left sidewalls 12 extending upwardly from lateral sides of the bottom wall 11, which commonly define a card receiving space 13 for accommodating the SIM card 100. The bottom wall 11 defines an U-shape opening 14 at rear edge thereof and is formed with a plurality of rectangular passages 110 arranged in two rows along a card insertion/ejecting direction. Each passage 110 is through the bottom plate 11 in an up-and down direction. The bottom plate 11 defines a receiving recess 15 adjacent to and extending along a sidewall 12 for receiving the ejector 30. A rectangle slot 150 is defined in a center of the receiving recess 15 with a same figure as the passage 110. The passagess 110 and the rectangle slot 150 ulteriorly extend rearward to form a plurality of channels (not labeled) communicating with the opening 14 for retaining the contacts 20.

The contacts 20 which are insert-molded with the insulating housing 10 respectively, include six signal contacts 21 divided into two groups and two grounding contacts 22 arranged in a line. Each contact 20 comprises a contacting portion 23, an intermediate portion (not labeled) extending rearward from the contacting portion 23 and molded in the insulating housing 10 and a soldering portion 24. The contacting portions 23 of the signal contacts 21 are received in the corresponding passage 110 and exposed into the card receiving space 13 for contacting with the card 100, the contacting portions 23 of the grounding contacts 22 are received in the rectangle slot 150 and protrude from the bottom plate 11 for contacting with the ejector 30. All the soldering portions 24 extend rearward to expose into the opening 14, and the ends of the soldering portions 24 are arranged in a line and inwardly of the rear face of the insulating housing 10.

Referring to FIG. 3, the receiving recess 15 is along the card insertion/ejecting direction for accommodating the ejector 30, the right sidewall 12 of the insulating housing 10 is formed with a pair of front and rear walls 16 at front and rear ends of the receiving recess 15. The bottom wall 11 defines a groove 152 under the card receiving space 13 and communicating with a rear end of the receiving recess 15. A column 162 protrudes forwardly from the rear wall 16 and is exposed into the receiving recess 15, a gap 153 is formed on the receiving recess 15 under the column 162 and downwardly through the receiving recess 15. A downwardly recessed hole 161 is formed on the rear wall 16 in alignment with the column 162 along the card insertion/ejecting direction.

Figure 4:
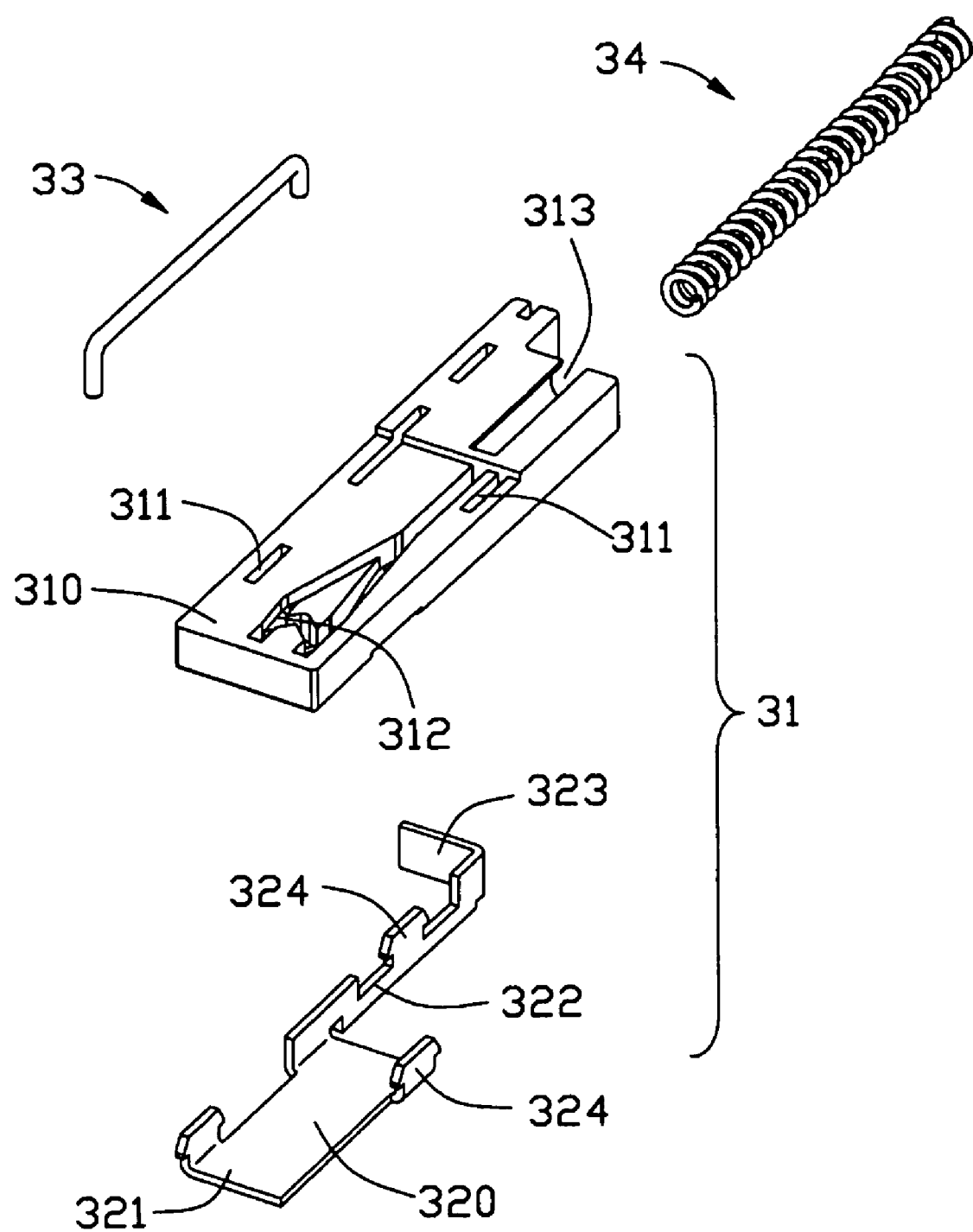
FIG. 4 is an exploded, perspective view of the ejector of the card connector in FIG. 1.
Figure 5:
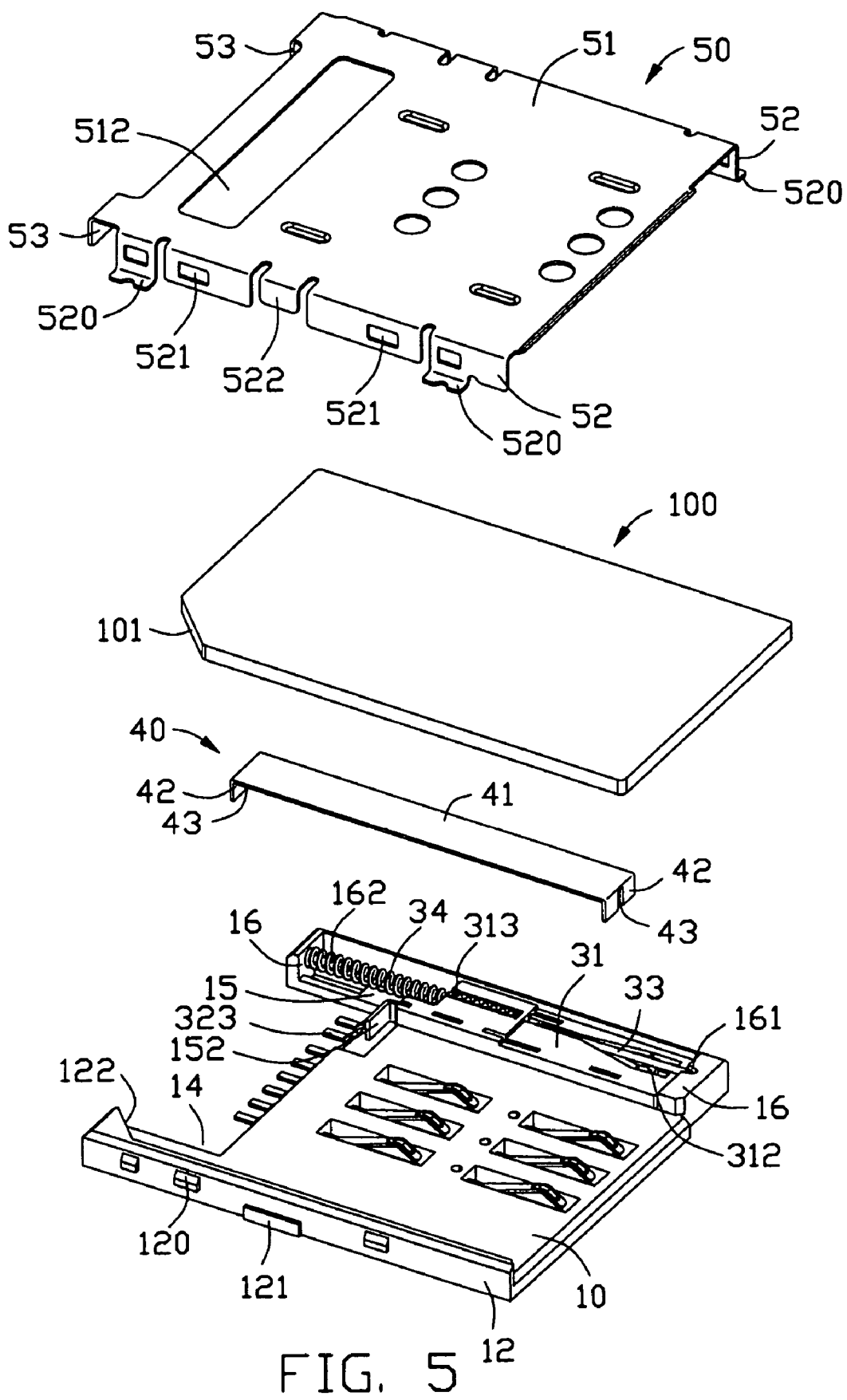
FIG. 5 is an exploded, perspective view of the card connector in accordance with the present invention.

Referring to FIGS. 3-5, the ejector 30 is used for ejecting the SIM card 100 out of the card connector. The ejector 30 comprises a slider 31, a pin member 33, a resilient member 34 located on a rear end of the slider 31 and an ejecting member 320 for contacting and ejecting the SIM card 100 directly. In this embodiment, the resilient member 34 is a spring and the ejecting member 320 is a separate component. However, the ejecting member 320 also can be unitary with the slider 31 on condition that the ejecting member 320 can protrude into the card receiving space 13 to eject the SIM card 100.

The slider 31 is approximately an elongated cube configuration and movable along the card insertion and ejecting direction with the SIM card 100 inserted and ejected. The slider 31 is movably received in the receiving recess 15 of the insulating housing 10, the slider 31 defines a heart-shaped slot 312 recessed downwardly from a top face thereof, a semi-circular receiving hole 313 recessed forwardly from a rear face thereof and a plurality of through slots 311 recessed downwardly from a top face through a bottom face of lateral sides of the slider 31.

One end of the spring 34 is disposed around the column 162 of the rear wall 16 and the other end is set in the receiving hole 313 of the slider 31. One end of the pin member 33 is moveably disposed in the heart-shaped slot 312 of the slider 31 and the other end is securely locked in the hole 161 of the front wall 16 of insulating housing 10. The pin member 33 and the heart-shaped slot 312 are referred as a holding equipment, which can hold the slider 31 and the card 100 in a final position where the card 100 is electrically connected with the card connector, and can release the slider 31 when ejecting the card 100.

The ejecting member 320 is stamped from a metal sheet. The ejecting member 320 comprises a horizontal plate 321 and an upright holding arm 322 extending upward and rearward from a rear end of inner side of the horizontal plate 321 adjacent to the card receiving space 13. A plurality of hooks 324 protrudes upwardly from the holding arm 322 and lateral sides of the horizontal plate 321, respectively. In addition, the holding arm 322 is formed with a rectangular plate-shaped ejecting arm 323 bent from a free end thereof and transversely protruding into the card receiving space 13 and locating in the groove 152 of the bottom wall 11. The ejecting member 320 is securely assembled to a bottom face of the slider 31 with the hooks 324 interferencely received in the through slots 311 of the slider 31.

referring to FIG. 2 and FIG. 5, the metal frame 40 is formed by a metal bar and comprises a rectangle horizontal plate 41 and two upright front and rear blocking wall 42 bent downwardly from front and rear ends of the horizontal plate 41 and each defining a aperture 43. The horizontal plate 41 has a same length as that of the receiving recess 15 of the bottom wall 11. The metal frame 40 covers the ejector 30, with the horizontal plate 41 over a top face of the ejector 30, the front blocking walls 42 inserting into an interspace between the slider 31 and the front wall 16 and the rear blocking walls 42 inserting into an interspace between the spring 34 and the rear wall 16. The apertures 43 of the blocking wall 42 are used for passing through by the column 162 and the end of the pin member 33 close to the hole 161, respectively. In fact, the front and rear blocking walls 42 not only closes to but also abuts against the slider 31 and the spring 34.

The spring 34 has a precompression at a preliminary position to get an enough force at a final position for ejecting the card 100, the blocking walls 42 of the metal frame 40 support the elasticity of the spring 34, the elasticity of the spring 34 does not act on the insulating housing 10, so the front and rear wall 16 of the insulating housing 10 will not distort by an outside force in a process of soldering the contacts 20 to a print circuit board (not labeled), during which the insulating housing need be put in a heating furnace. More important, the metal frame 40 will keep the precompression of the spring 34 at the preliminary position and the ejector 30 working normally. In addition, since the metal frame 40 covers the ejector 30, the pin member 33 will not fly out of the card connector.

Referring to FIG. 5, the shell 50 is made of metal sheet to cover the housing 10. The shell 50 comprises a top plate 51, a pair of opposite right and left side portions 52 extending downwardly from lateral sides of the top plate 51 and a front wall 53 bent from a front edge of the top plate 51. A rectangular opening 512 is defined in rear end of the base potion 51 to communicate with the opening 14 of the insulating housing 10. Each side portion 52 is formed with a pair of soldering feet 520 on opposite distal ends along the card insertion direction for being mounted on a printed circuit board (not shown). Each side portion also provide a plurality of mating holes 521 and an engaging piece 522, the insulating housing 10 is formed with a plurality of wedges 120 and a protruding block 121 in each sidewall 12 to mate with the corresponding mating holes 521 and the engaging piece 522, respectively. Thus, the shell 50 is securely assembled to the insulating housing 10.

The SIM card 100 defines a cutout 101 in a corner between a rear end and a left side thereof. The left sidewall 12 of the insulating housing 10 is formed with a slanting face 122 faced to the card receiving space 13 at rear end thereof to recognize the cutout 101 in order to prevent the SIM card 100 from mismating. In process of the SIM card 100 inserting the card connector, a rear end of a right side of the card 100 will drive the slider 31 to move along the card insertion direction and to urge the spring 34 to elastically distort. In the meantime, the pin member 33 moves along the heart-shaped slot 312 of the ejector 30 to make the slider 31 finally achieve a final position or a locking position where the card 100 is electrically connected with the contacts 20 accurately and fully. In addition, the grounding contacts 22 are electrically connected with the horizontal plate 321 of the ejecting member 320 of the ejector 30 to discharge static.

When ejecting the card 100, a rearward push force is exerted to the card 100 to make the pin member 33 move along the heart-shaped slot 312 again so as to release the slider 31 from the final position. At this time, the resilient restorable force of the spring 34 urges the slider 31 to move along the card ejecting direction so as to eject the card 100 out of the card connector in virtue of the ejecting arm 323 of ejector 30 pushing the card 100.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector adapted for receiving a card, comprising:
   an insulating housing defining a card receiving space with a card insertion/ejecting direction;
   a plurality of contacts retained in the insulating housing;
   an ejector received in the insulating housing comprising a slider movable along the card insertion/ejecting direction, an ejecting member, and a resilient member disposed in an end of the slider;
   a shell attached to the housing and confirming the card receiving space; and
   a metal frame discrete from the shell holding and covering above the ejector at one side of the insulating housing at a preliminary position, with two taps formed on the two ends respectively abutting against the slider and the resilient member in such a way that the slider and the resilient member are sandwiched between the two taps of the metal frame.

2. The card connector as described in claim 1, wherein the metal frame comprises a base and two front and rear blocking walls respectively bent from front and rear ends of the base, the front and rear blocking walls respectively abutting against the resilient member and the slider.

3. The card connector as described in claim 2, wherein the slider defines a heart-shape slot, the rear blocking wall abutting against the slider defines an aperture, the ejector comprises a pin member with two ends, one end movable along the heart-shape slot and the other retained to the insulating housing through the aperture.

4. The card connector as described in claim 2, wherein the resilient member is a spring, the insulating housing is formed with a column for seating the spring, and the front blocking wall defines an aperture for passing through by the column.

5. The card connector as described in claim 1, wherein the metal frame comprises a horizontal plate and two upright front and rear blocking walls respectively bent downwardly from front and rear ends of the horizontal plate, the front and rear blocking walls respectively abutting against the resilient member and the slider.

6. The card connector as described in claim 1, wherein the ejecting member of the ejector is stamped from a metal sheet and formed with an ejecting arm extending transversely protruding into the card receiving space to expose in the card receiving space.

7. The card connector as described in claim 6, wherein the ejecting member has a horizontal plate, an upright holding arm extending upward from a front end of the horizontal plate, and the ejecting arm being disposed at a free end of the holding arm, the ejecting member being assembled to the slider with the horizontal plate against the bottom face of the slider.

8. The card connector as described in claim 6, wherein the insulating housing defines a receiving recess along the card insertion/ejecting direction for accommodating the ejector and a groove transversely communicating with a rear end of the receiving recess for setting the ejecting arm of the ejecting member.

9. The card connector as described in claim 1, wherein the contacts have grounding contacts to contact with the ejecting member.

10. The card connector as described in claim 1, wherein the insulating housing defines an opening at a rear end thereof, each contact has a soldering portions, the soldering portions are exposed in the opening and inwardly of the rear face of the insulating housing.

11. A card connector adapted for receiving a card, comprising:
    an insulating housing defining a card receiving space with a card insertion/ejecting direction;
    a plurality of contacts retained in the insulating housing;
    an ejector received in the insulating housing comprising a slider movable along the card insertion/ejection direction, an ejecting member, and a resilient member disposed around an end of the slider;
    a shell attached to the housing and confining the card receiving space; and
    a metal frame having a horizontal plate with two metallic tabs intersecting with said insertion/ejecting direction and spaced from each other along said card insertion/ejection direction; wherein said two metallic tabs respectively abutting against the resilient member and the slider; wherein
    said slider and said resilient member are movable disposed in a space between said two metallic tabs along said insertion/ejecting direction so as to assure that all forces generated by said resilient member along said insertion/ejecting direction will be absorbed by said two metallic tabs without affecting the housing.

12. The card connector as claim in claim 11, wherein said two metallic tabs are integrally formed each other.

13. The card connector as claim in claim 12, wherein said frame receives said ejector therein.

14. The card connector as claim in claim 13, wherein said metallic shell fully upwardly shields the whole frame thereabouts in a vertical direction without being exposed to an exterior.

15. The card connector as claimed in claim 14, wherein both of said metallic tabs are hidden behind corresponding portions of the housing in said insertion/ejection direction without being exposed to the exterior.

16. The card connector as claimed in claim 14, wherein said corresponding portions of the housing are hidden behind another corresponding portions of the shell in said insertion/ejection direction without being exposed to the exterior.

17. The card connector as claim in claim 11, wherein said two metallic tabs are unitarily formed each other.

18. A card connector adapted for receiving a card, comprising:
    an insulating housing defining a card receiving space with a card insertion/ejecting direction;
    a plurality of contacts retained in the insulating housing;
    an ejector received in the insulating housing comprising a slider movable along the card insertion/ejecting direction, an ejecting member, and a resilient member disposed around an end of the slider;
    a metallic shell attached to the housing and confining the card receiving space;
    two metallic tabs intersecting with said insertion/ejecting direction; wherein the two metallic tabs respectively abutting against the resilient member and the slider in such away that the slider and the resilient member are sandwiched between the two metallic taps along the insertion/ejecting direction experiencing a force along the insertion direction derived from the resilient member; wherein
    the metallic tab is discrete from said metallic shell, and fully upwardly shielded by said metallic shell without being exposed to an exterior.

19. The card connector as claimed in claim 18, wherein said metallic tabs is further hidden behind a corresponding portion of the housing along the ejecting direction without being exposed to the exterior.

20. The card connector as claimed in claim 19, wherein said corresponding portion of the housing is further hidden behind another corresponding portion of the shell along said ejecting direction without being exposed to the exterior.

* * * * *